US011413905B2

(12) United States Patent
Kageyama et al.

(10) Patent No.: US 11,413,905 B2
(45) Date of Patent: Aug. 16, 2022

(54) TIRE RUBBER COMPOSITION

(71) Applicant: The Yokohama Rubber Co., LTD., Tokyo (JP)

(72) Inventors: Hirokazu Kageyama, Hiratsuka (JP); Kazushi Kimura, Hiratsuka (JP); Genichiro Shimada, Hiratsuka (JP); Satoshi Mihara, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 933 days.

(21) Appl. No.: 16/303,113

(22) PCT Filed: May 18, 2017

(86) PCT No.: PCT/JP2017/018688

§ 371 (c)(1),
(2) Date: Nov. 19, 2018

(87) PCT Pub. No.: WO2017/200044

PCT Pub. Date: Nov. 23, 2017

(65) Prior Publication Data

US 2020/0316995 A1 Oct. 8, 2020

(30) Foreign Application Priority Data

May 19, 2016 (JP) ............................ JP2016-100749

(51) Int. Cl.

| | |
|---|---|
| ***B60C 1/00*** | (2006.01) |
| ***C08G 18/10*** | (2006.01) |
| ***C08G 18/44*** | (2006.01) |
| ***C08G 18/50*** | (2006.01) |
| ***C08G 18/76*** | (2006.01) |
| ***C08K 3/04*** | (2006.01) |
| ***C08K 3/06*** | (2006.01) |
| ***C08K 5/00*** | (2006.01) |
| ***C08K 5/37*** | (2006.01) |
| ***C08L 7/02*** | (2006.01) |
| ***C08L 25/10*** | (2006.01) |

(52) U.S. Cl.

CPC ............ *B60C 1/0016* (2013.01); *C08G 18/10* (2013.01); *C08G 18/44* (2013.01); *C08G 18/5072* (2013.01); *C08G 18/7657* (2013.01); *C08K 3/04* (2013.01); *C08K 3/06* (2013.01); *C08K 5/0025* (2013.01); *C08K 5/37* (2013.01); *C08L 7/02* (2013.01); *C08L 25/10* (2013.01); *C08G 2270/00* (2013.01); *C08G 2380/00* (2013.01); *C08L 2201/52* (2013.01); *C08L 2205/18* (2013.01)

(58) Field of Classification Search

CPC ...... B60C 1/0016; C08G 18/10; C08G 18/44; C08G 18/5072; C08G 18/7657; C08G 2270/00; C08G 2380/00; C08K 3/04; C08K 3/06; C08K 5/0025; C08K 5/37; C08L 7/02; C08L 25/10; C08L 2201/52; C08L 2205/18

See application file for complete search history.

(56) References Cited

U.S. PATENT DOCUMENTS

| | | | |
|---|---|---|---|
| 8,053,496 | B1 | 11/2011 | Minouchi et al. |
| 2014/0296439 | A1 | 10/2014 | Qiao et al. |
| 2015/0105490 | A1 | 4/2015 | Qiao et al. |

FOREIGN PATENT DOCUMENTS

| | | |
|---|---|---|
| JP | 2000-026660 | 1/2000 |
| JP | 2005-194418 | 7/2005 |
| JP | 2012-144680 | 8/2012 |
| JP | 2014-062141 | 4/2014 |
| JP | 2015-067635 | 4/2015 |
| JP | 2015-067636 | 4/2015 |
| WO | WO 2013/060288 | 5/2013 |
| WO | WO 2013/060290 | 5/2013 |

OTHER PUBLICATIONS

JP 2000-026660 Machine translation (Year: 2000).*
JP 2005-194418 Machine translation (Year: 2005).*
JP 2012-144680 Machine translation (Year: 2012).*
International Search Report for International Application No. PCT/JP2017/018688 dated Aug. 1, 2017, 4 pages, Japan.

* cited by examiner

*Primary Examiner* — Edward J Cain
(74) *Attorney, Agent, or Firm* — Thorpe North & Western

(57) ABSTRACT

The present technology provides a tire rubber composition formed by blending a microparticle composite, which is formed from a solid component of a mixture containing an emulsion of an organic microparticle and a rubber latex, in a sulfur vulcanizable rubber; the emulsion of the organic microparticle being an emulsion containing a microparticle obtained by polymerizing and/or crosslinking at least one selected from the group consisting of polymerizable monomers, and oligomers, prepolymers, and polymers having a reactive functional group and having a molecular weight from 500 to 50000 simultaneously or stepwise in water; and an average particle size of the microparticle being from 0.001 to 100 μm.

20 Claims, 1 Drawing Sheet

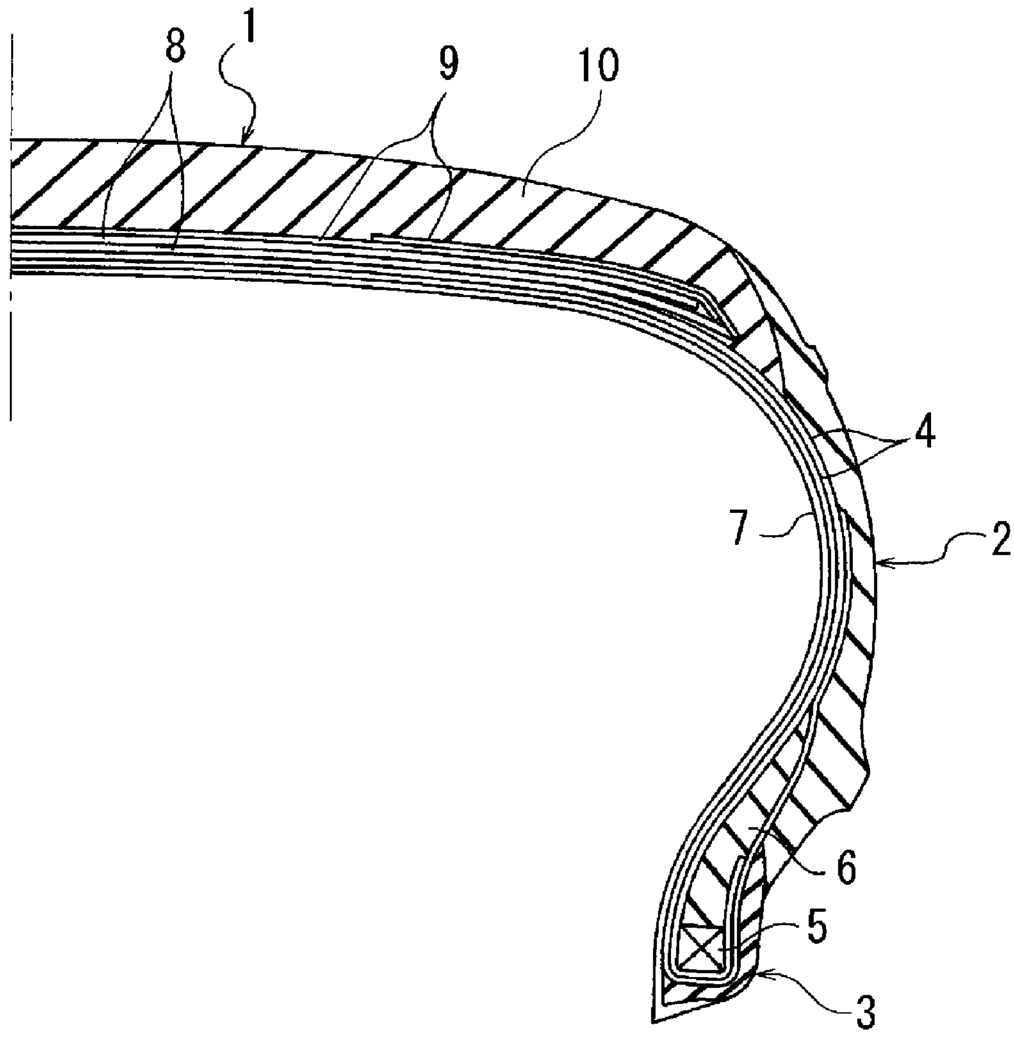
1
8
9
10
4
7
2
6
5
3

TIRE RUBBER COMPOSITION

TECHNICAL FIELD

The present technology relates to a novel tire rubber composition containing an organic microparticle having a crosslinked structure.

BACKGROUND ART

In recent years, higher performances of pneumatic tires have been achieved, and tire rubber compositions are demanded to have excellent wet grip performance and low rolling resistance while mechanical properties, such as tensile stress, tensile strength at break, and tensile elongation at break, are maintained or enhanced. Various studies have been conducted.

Japan Patent Publication Nos. 2015-067635 and 2015-067636 propose to blend microparticles that have been three-dimensionally crosslinked in tire rubber compositions. This three-dimensionally crosslinked microparticle is advantageous to enhance performance on ice and wear resistance of a studless tire due to its small JIS (Japanese Industrial Standard) A hardness. Meanwhile, when this three-dimensionally crosslinked microparticle is blended, there is room for improvement because it cannot enhance wet grip performance and low rolling resistance while mechanical properties of a rubber composition, such as tensile stress, tensile strength at break, and tensile elongation at break, are enhanced.

SUMMARY

The present technology provides a tire rubber composition by which wet grip performance and low rolling resistance are enhanced equal to or beyond levels in the related art while mechanical properties, such as tensile stress, tensile strength at break, and tensile elongation at break, are maintained or enhanced.

The tire rubber composition of an embodiment of the present technology that achieves the object described above is a tire rubber composition including a microparticle composite in a sulfur vulcanizable rubber; the microparticle composite being a solid component of a mixture formed from an emulsion of an organic microparticle and a rubber latex; the emulsion of the organic microparticle being an emulsion containing a microparticle obtained by polymerizing and/or crosslinking at least one selected from the group consisting of polymerizable monomers, and oligomers, prepolymers, and polymers having a reactive functional group and having a molecular weight from 500 to 50000 simultaneously or stepwise in water; and an average particle size of the microparticle being from 0.001 to 100 μm.

According to the tire rubber composition of an embodiment of the present technology, because a microparticle composite, which is formed from a solid component of a mixture formed from a rubber latex and an emulsion of an organic microparticle formed from an emulsion containing a microparticle obtained by polymerizing and/or crosslinking at least one selected from the group consisting of polymerizable monomers, and oligomers, prepolymers, and polymers having a reactive functional group and having a molecular weight from 500 to 50000 simultaneously or stepwise in water, is blended in a sulfur vulcanizable rubber, wet grip performance and low rolling resistance can be enhanced equal to or beyond levels in the related art while mechanical properties, such as tensile stress, tensile strength at break, and tensile elongation at break, are maintained or enhanced.

In an embodiment of the present technology, the at least one selected from the group consisting of oligomers, prepolymers, and polymers may have at least one selected from the group consisting of a mercapto group, a sulfur atom, and polysulfide bonds containing at least two sulfur atoms. Furthermore, the at least one selected from the group consisting of oligomers, prepolymers, and polymers may further have at least one other reactive functional group except the group consisting of a mercapto group, a sulfur atom, and polysulfide bonds containing at least two sulfur atoms. The polymerizable monomer may have at least one sulfur atom. Furthermore, the polymerizable monomer may be formed from two or more types of polymerizable monomers, and at least one of the polymerizable monomers may have a mercapto group and/or a polysulfide bond having at least two sulfur atoms.

The tire rubber composition of an embodiment of the present technology preferably contains from 1 to 100 parts by mass of the organic microparticle per 100 parts by mass total of the sulfur vulcanizable rubber and a solid content that is derived from the rubber latex. Furthermore, a ratio W1/W2 of a mass W1 of the sulfur vulcanizable rubber to a mass W2 of the solid component derived from the rubber latex is preferably in a range from 95/5 to 50/50.

Furthermore, the rubber latex may be a natural rubber latex or a synthetic rubber latex. The solid component derived from the rubber latex is preferably 30 mass % or greater in the rubber latex, and a ratio W2/W3 of a mass W2 of the solid component derived from the rubber latex to a mass W3 of the organic microparticle is preferably in a range from 1/4 to 4/1. A compounding agent is preferably further contained, and the compounding agent is preferably at least one selected from the group consisting of carbon blacks, white fillers, vulcanizing agents, vulcanization accelerators, softeners, oils, anti-aging agents, antioxidants, vulcanization retarders, and silane coupling agents.

A pneumatic tire having a tire tread formed from the tire rubber composition of an embodiment of the present technology can achieve excellent wear resistance, durability, wet grip performance, and low rolling resistance.

The method of producing a tire rubber composition of an embodiment of the present technology includes: a step of preparing an emulsion of an organic microparticle by polymerizing and/or crosslinking at least one selected from the group consisting of polymerizable monomers, and oligomers, prepolymers, and polymers having a reactive functional group and having a molecular weight from 500 to 50000 simultaneously or stepwise in water to form a microparticle having an average particle size from 0.001 to 100 μm; a step of preparing a microparticle composite by mixing the obtained emulsion of the organic microparticle with a rubber latex and then removing water of the mixture; and a step of blending the obtained microparticle composite with a sulfur vulcanizable rubber.

BRIEF DESCRIPTION OF DRAWINGS

FIG. 1 is a partial cross-sectional view in a tire meridian direction that illustrates an example of an embodiment of a pneumatic tire in which a tire rubber composition according to an embodiment of the present technology is used.

DETAILED DESCRIPTION

FIG. 1 is a cross-sectional view that illustrates an example of an embodiment of a pneumatic tire in which a tire rubber composition is used. The pneumatic tire is formed from a tread portion 1, a sidewall portion 2, and a bead portion 3.

In FIG. 1, two layers of a carcass layer 4, formed by arranging reinforcing cords, which extend in a tire radial direction, at a predetermined pitch in the tire circumferential direction and embedding these reinforcing cords in a rubber layer, extend between left and right bead portions 3. Both ends of the carcass layer 4 are made to sandwich a bead filler 6 and are folded back around a bead core 5 that is embedded in the bead portions 3 in a tire axial direction from the inside to the outside. An inner liner layer 7 is disposed inward of the carcass layer 4. Two layers of a belt layer 8, formed by arranging reinforcing cords extending inclined to the tire circumferential direction in the tire axial direction at a predetermined pitch and embedding these reinforcing cords in a rubber layer, are disposed on an outer circumferential side of the carcass layer 4 of the tread portion 1. The inclination direction with respect to the tire circumferential direction of the reinforcing cords of the two belt layers 8 intersect so as to be opposite each other in the tire circumferential direction. A belt cover layer 9 is disposed outward of the belt layers 8. The tread portion 1 is formed by a tread rubber layer 10 on the outer circumferential side of the belt cover layer 9. The tread rubber layer 10 is preferably formed from the tire rubber composition according to an embodiment of the present technology.

In the tire rubber composition of an embodiment of the present technology, the rubber component is a sulfur vulcanizable rubber having a carbon-carbon double bond in its main chain. Examples of the sulfur vulcanizable rubber include a natural rubber (NR), isoprene rubber (IR), styrene-butadiene rubber (SBR), butadiene rubber (BR), acrylonitrile butadiene rubber (NBR), butyl rubber (IIR), chlorinated butyl rubber (Cl-IIR), brominated butyl rubber (Br-IIR), chloroprene rubber (CR), and the like, and a single type of these or a discretionary blend of these can be used. Furthermore, an olefin-based rubber, such as an ethylene propylene diene rubber (EPDM), styrene isoprene rubber, styrene isoprene butadiene rubber, or isoprene butadiene rubber, may be blended. Among these, a natural rubber, styrene butadiene rubber, butadiene rubber, and butyl rubber are preferable as the sulfur vulcanizable rubber.

The tire rubber composition of an embodiment of the present technology is formed by blending a microparticle composite into the sulfur vulcanizable rubber described above. The microparticle composite is formed from a solid component of a mixture containing a rubber latex and an emulsion of organic microparticles. Note that the organic microparticle is a microparticle obtained by polymerizing and/or crosslinking at least one selected from the group consisting of polymerizable monomers, oligomers, prepolymers, and polymers simultaneously or stepwise in water. Among these, the oligomers, the prepolymers, and the polymers each have a reactive functional group and have a molecular weight from 500 to 50000. The average particle size of each of the microparticles is from 0.001 to 100 μm. One type, or two or more types from the same category or each from different categories can be selected from the polymerizable monomers, the oligomers, the prepolymers, and the polymers.

The polymerizable monomer is a compound that is polymerizable, in water, with another polymerizable monomer of the same type or different type. The polymerization reaction may be addition polymerization, condensation polymerization, or addition-condensation polymerization. Examples of the polymerizable monomer to be addition-polymerized include ethylene, α-olefin, diene compounds, maleic acid anhydride, styrene, styrene derivatives, (meth)acrylic acid, (meth)acrylic acid derivatives, vinyl chloride, vinyl acetate, polyisocyanate, polythiol, polycarboxylic acid, polyol, polyamine, and the like. These polymerizable monomers can be subjected to homopolymerization or a plurality of types thereof can be subjected to copolymerization. Among these described above, preferable polymerizable monomers include (meth)acrylic acid, (meth)acrylic acid derivatives, polyisocyanate, polyol, and polyamine. Examples of the polymerizable monomer to be condensation-polymerized include polycarboxylic acid, polyol, polyamine, bisphenol A, lactam, w-amino acid, and the like.

One type or two or more types of the polymerizable monomers may be employed. At least one of one or more types of the polymerizable monomers may have at least one selected from the group consisting of a mercapto group, a sulfur atom, and polysulfide bonds containing at least two sulfur atoms. Examples of such a polymerizable monomer having a sulfur atom include 2-methyl-4,6-bis(methylthio)-1,3-benzenediamine, 4-methyl-2,6-bis(methylthio)-1,3-benzenediamine, 2-(ethylthio)ethylacrylate, 2,2'-dithiodiethanoldiacrylate, 2,2'-thiodiethyldiacrylate, 2,2'-thiodiethanol, (2-hydroxyethyl)disulfide, 2,2'-thiodiacetic acid, 2,2'-dithiodiacetic acid, 1,4-butanedithiol, 4,5-bis(mercaptomethyl)-o-xylene, 1,4-benzenedithiol, 1,4-butanediolbis(thioglycolate), 1,10-decanedithiol, 3,6-dioxa-1,8-octanedithiol, 1,2-ethanedithiol, 1,6-hexanedithiol, 1,3-propanedithiol, pentaerythritoltetrakis(mercaptoacetate), trimethylolpropane tris(3-mercaptopropionate), trimethylolpropanetris (thioglycolate), and the like.

As the polymerizable monomer, two or more types of the polymerizable monomers may be used for copolymerization, and at least one of the polymerizable monomers may have a mercapto group and/or a polysulfide bond having at least two sulfur atoms. Examples of the polysulfide bond having at least two sulfur atoms include a disulfide bond, a trisulfide bond, a tetrasulfide bond, and the like. Examples of the polymerizable monomer having a mercapto group and/or a polysulfide bond include 2-(ethylthio)ethyl acrylate, 2,2'-dithiodiethanol diacrylate, 2,2'-thiodiethyl diacrylate, 2,2'-thiodiethanol, (2-hydroxyethyl) disulfide, 2,2'-thiodiacetic acid, 2,2'-dithiodiacetic acid, and the like.

The polymerizable monomer described above forms an organic microparticle by being polymerized and crosslinked in water, or by being polymerized and/or crosslinked with at least one selected from the group consisting of oligomers, prepolymers, and polymers. The polymerization method of the polymerizable monomer may be an ordinary method depending on the type of the monomer. Furthermore, the method of crosslinking the obtained polymerizable monomer may be an ordinary method. The average particle size of the obtained organic microparticles is from 0.001 to 100 μm, preferably from 0.002 to 50 μm, more preferably from 0.005 to 5 μm, and even more preferably from 0.01 to 1 μm. When the average particle size of the microparticles is less than 0.001 μm, production of the microparticles becomes difficult and tensile stress and tensile strength at break cannot be sufficiently improved. Furthermore, when the average particle size of the microparticles is greater than 100 μm, tensile stress and tensile strength at break cannot be sufficiently improved. In the present specification, the average particle size means an average value of equivalent circle diameters measured by using a laser microscope. For example, the average particle size can be measured by using the laser diffraction scattering particle size distribution analyzer LA-300 (available from Horiba, Ltd.) or the laser microscope VK-8710 (available from Keyence Corporation).

In an embodiment of the present technology, the organic microparticles can be formed by, in water, polymerizing and/or crosslinking oligomers, prepolymers, or polymers having a reactive functional group and having a molecular weight from 500 to 50000. Examples of the type of the reactive functional group include a mercapto group, a carboxyl group, an epoxy group, a glycidyl group, an acyl group, a vinyl group, a (meth)acryloyl group, an acid anhydride group, a hydroxyl group, a silanol group, an alkoxysilyl group, an amino group, an isocyanate group, and the like. The reactive functional group is more preferably at least one selected from the group consisting of a mercapto group, a hydroxyl group, an isocyanate group, an amino group, a glycidyl group, a silanol group, an alkoxysilyl group, a vinyl group, and a (meth)acryloyl group.

These reactive functional groups form a three-dimensionally crosslinked structure by participating in the crosslinking and being interposed. That is, the reactive functional group bonds the polymers constituting the organic microparticle to form a part of the three-dimensionally crosslinked structure. In the three-dimensionally crosslinked structure, the reactive functional group may directly bond the adjacent polymers, or the crosslinked structure may be formed as a result of the action of a crosslinking agent that is added separately.

Furthermore, the backbones of the oligomers, the prepolymers, and the polymers are not particularly limited as long as the backbone is a backbone that can have the reactive functional group described above. Examples thereof include polycarbonate-based, aliphatic-based, saturated hydrocarbon-based, and acrylic-based polymers or copolymers, and the like. Examples of the aliphatic-based polymer or copolymer include liquid diene polymers, such as polyisoprene, polybutadiene, and styrene-butadiene copolymers; chloroprene rubber; butyl rubber; nitrile rubber; modified products containing a partially hydrogenated product of these and/or a reactive functional group described below; and the like.

Furthermore, examples of the saturated hydrocarbon-based polymer or copolymer include hydrogenated polyisoprene, hydrogenated polybutadiene, ethylene propylene, epichlorohydrin, chlorinated polyethylene, chlorosulfonated polyethylene, hydrogenated nitrile rubber, polyisobutylene, acrylic rubber, and the like.

Furthermore, examples of the polycarbonate-based polymer or copolymer include polycarbonate polyols obtained by transesterification reaction of polyol compounds (e.g. 1,6-hexanediol, 1,4-butanediol, 1,5-pentanediol, and the like) and dialkyl carbonates, particularly polycarbonate diols, and the like. Furthermore, examples thereof include polycarbonate polyurethanes formed from polycarbonate polyol and polyisocyanate.

Furthermore, examples of the acrylic-based polymer or copolymer include acrylic polyols; homopolymers of acrylates, such as acrylate, methyl acrylate, ethyl acrylate, butyl acrylate, and 2-ethylhexyl acrylate; acrylate copolymers formed by combining two or more types of these acrylates; and the like.

The molecular weights of the oligomers, the prepolymers, and the polymers are from 500 to 50000, preferably from 500 to 20000, more preferably from 500 to 15000, and even more preferably from 1000 to 10000. When the molecular weight is less than 500, physical properties of the tire rubber composition cannot be sufficiently enhanced. Furthermore, when the molecular weights of the oligomers, the prepolymers, and the polymers are greater than 50000, adjustment of the particle size during the formation of the microparticle becomes difficult. In the present specification, the molecular weights of the oligomers, the prepolymers, and the polymers are weight average molecular weights measured by gel permeation chromatography (GPC) based on calibration with polystyrene standards.

The oligomers, the prepolymers, and the polymers may have at least one sulfur atom. Examples of the oligomers, the prepolymers, and the polymers having at least one sulfur atom include THIOKOL LP-33, THIOKOL LP-3, THIOKOL LP-980, THIOKOL LP-23, THIOKOL LP-56, THIOKOL LP-55, THIOKOL LP-12, THIOKOL LP-32, THIOKOL LP-2, THIOKOL LP-3, SULBRID 12, and the like.

Furthermore, the oligomers, the prepolymers, and the polymers may be each formed from two or more types of oligomers, prepolymers, and polymers, and at least one of these may have a mercapto group, a sulfur atom, and/or a polysulfide bond having at least two sulfur atoms. Examples of the polysulfide bond having at least two sulfur atoms include a disulfide bond, a trisulfide bond, a tetrasulfide bond, and the like. Furthermore, another one that is selected from the group consisting of oligomers, prepolymers, and polymers may further have another reactive functional group except the group consisting of a mercapto group, a sulfur atom, and polysulfide bonds containing at least two sulfur atoms.

Examples of the oligomer, the prepolymer, and the polymer each having a polysulfide bond in the main chain include liquid polysulfide polymers, polyethers having a disulfide bond, block polymers of a polysulfide polymer and a polyether, and the like. Furthermore, it is also possible to employ one molecule of compound having a disulfide bond obtained by oxidation of two molecules of thiol compounds. Furthermore, examples of the compound having a tetrasulfide bond include dipentamethylenethiuram tetrasulfide, benzimidazolyl-based tetrasulfide compounds, tetrasulfide-based silane coupling agents, and the like. In particular, the tetrasulfide-based silane coupling agent can be added to various oligomers, prepolymers, or polymers when modification is performed by silanol condensation thereof. The oligomer, prepolymer, or polymer having a mercapto group has a mercapto group at the terminal of the molecular chain or a side chain, and examples thereof include monomercapto compounds, such as alkyl mercaptan and mercaptosilane, polymers having a mercapto group of a functional thiol compound, and the like. Note that these polysulfide bonds and mercapto groups may participate in crosslinking of a copolymer constituting the organic microparticle.

The oligomer, the prepolymer, or the polymer described above forms an organic microparticle by being polymerized and/or crosslinked in water. The method of polymerizing the oligomer, the prepolymer, or the polymer may be an ordinary method depending on the type of the oligomer, the prepolymer, or the polymer. Furthermore, the method of crosslinking the obtained reaction product may be an ordinary method.

The organic microparticle is a microparticle formed by crosslinking a polymer, obtained by polymerizing a polysulfide bond and/or a mercapto group, and an oligomer, prepolymer, or polymer having a reactive functional group in water, by using a reactive functional group; or by polymerizing a polymerizable monomer in water to form a polymer and then crosslinking the polymer.

In the tire rubber composition of an embodiment of the present technology, it is difficult to identify and describe the emulsion of the organic microparticles by the structure and the characteristics. That is, the emulsion of the organic microparticles of an embodiment of the present technology is an emulsion in which the organic microparticles are finely and uniformly dispersed in water and, currently, it is extremely difficult to accurately describe this uniformity by the structure and the characteristics of the emulsion. Therefore, to identify the emulsion of the organic microparticles, the production method thereof needs to be described.

In an embodiment of the present technology, for the crosslinking, a crosslinking catalyst and a crosslinking agent can be used in addition to the reactive functional group. The crosslinking catalyst and the crosslinking agent can be selected as appropriate depending on the type of the reactive functional group. Furthermore, as needed, a compounding agent, such as a surfactant, an emulsifier, a dispersant, and a silane coupling agent, can be used.

The average particle size of the obtained organic microparticles is from 0.001 to 100 μm, preferably from 0.002 to 50 μm, more preferably from 0.005 to 5 μm, and even more preferably from 0.01 to 1 μm. When the average particle size of the microparticles is less than 0.001 μm, production of the microparticles becomes difficult and tensile stress and tensile strength at break cannot be sufficiently improved. Furthermore, when the average particle size of the microparticles is greater than 100 μm, tensile stress and tensile strength at break cannot be sufficiently improved.

This organic microparticle has a high strength and a high elastic modulus, and can be blended in a rubber composition in a manner that the organic microparticle replaces a part or all of carbon black and/or silica. By replacing a part of silica compounded in a rubber composition with this organic microparticle, tensile stress, tensile strength at break and tensile elongation at break, and viscoelastic characteristics at low temperatures and at high temperatures (mainly, tan δ) can be improved. Furthermore, by replacing a part of carbon black compounded in a rubber composition with the organic microparticle, tensile strength at break and tensile elongation at break, and viscoelastic characteristics at low temperatures and at high temperatures (mainly, tan δ) can be improved although tensile elasticity and initial tensile stress are slightly reduced.

The amount of the solid component derived from the rubber latex is not particularly limited but the amount of the solid component in the rubber latex is preferably 30 mass % or greater, and more preferably from 30 to 80 mass %. By setting the amount of the solid component derived from the rubber latex to 30 mass % or greater, dispersibility of the organic microparticles in the sulfur vulcanizable rubber can be efficiently enhanced.

Furthermore, when the mass of the solid component derived from the rubber latex is W2 and the mass of the organic microparticles is W3, the ratio W2/W3 of the mass W2 of the solid component to the mass W3 of the organic microparticles is preferably in a range from 1/4 to 4/1, and more preferably in a range from 1/1 to 4/1. By setting the ratio W2/W3 to a range from 1/4 to 4/1, the dispersibility of the organic microparticles in the sulfur vulcanizable rubber can be enhanced.

The emulsion of the organic microparticles obtained as described above is mixed with a rubber latex, and the solid component obtained by removing water from the mixture becomes a microparticle composite. Because this microparticle composite has a form in which the solid component of the rubber latex covers the surface of the organic microparticle, dispersibility of the organic microparticles in the sulfur vulcanizable rubber can be enhanced. The rubber latex is a natural rubber latex or a synthetic rubber latex. Examples of the synthetic rubber latex include isoprene-based, butadiene-based, styrene-butadiene-based, acrylonitrile-butadiene-based, and methyl methacrylate-butadiene-based latexes.

The method of mixing the emulsion of the organic microparticles and the rubber latex is not particularly limited, and an ordinary method can be used. The mixing method can be performed by using a homogenizer, a rotary mixer, an electromagnetic mixer, a propeller mixer, and the like.

Then, by removing water contained in this mixture, a microparticle composite formed from the solid component of the mixture of the emulsion of the organic microparticles and the rubber latex is obtained. By forming the solid component by removing water of the mixture, excellent mixability and dispersibility in the sulfur vulcanizable rubber can be achieved. The method of removing water of the mixture of the emulsion of the organic microparticles and the rubber latex is not particularly limited, and an ordinary method can be used. Examples of the method of water removal include solid-liquid separation methods, such as filtration, centrifugal separation, and vacuum dehydration, and/or drying methods, such as hot wind drying, vacuum drying, freeze drying, and spray drying.

The tire rubber composition of an embodiment of the present technology is obtained by blending the microparticle composite, formed from the solid component of the mixture of the emulsion of the organic microparticles obtained as described above and the rubber latex, in the sulfur vulcanizable rubber. In this tire rubber composition, by replacing a part or all of carbon black and/or silica with this organic microparticle, mechanical properties, such as tensile stress, tensile strength at break, and tensile elongation at break, and viscoelastic characteristics at low temperatures and at high temperatures (mainly, tan δ) can be maintained or enhanced.

The compounded amount of the organic microparticles is preferably from 1 to 100 parts by mass, and more preferably from 1 to 50 parts by mass, per 100 parts by mass total of the solid content derived from the rubber latex and the sulfur vulcanizable rubber. By setting the compounded amount of the organic microparticles to 1 part by mass or greater, mechanical properties, such as tensile stress, tensile strength at break, and tensile elongation at break, and viscoelastic characteristics at low temperatures and at high temperatures (mainly, tan δ) can be maintained or enhanced. Furthermore, by setting the compounded amount of the organic microparticles to 100 parts by mass or less, increase of the production cost of the tire rubber composition can be suppressed.

In the tire rubber composition, when the mass of the sulfur vulcanizable rubber is W1, the ratio W1/W2 of the mass W1 of the sulfur vulcanizable rubber to the mass W2 of the solid component derived from the rubber latex is preferably in a range from 95/5 to 50/50, and more preferably in a range from 90/10 to 60/40. By setting the ratio W1/W2 to a range from 95/5 to 50/50, the mass W2 of the solid component derived from the rubber latex can be made appropriate, and the dispersibility of the organic microparticles in the sulfur vulcanizable rubber can be enhanced.

The tire rubber composition of an embodiment of the present technology may contain at least one compounding agent selected from the group consisting of carbon blacks, white fillers, vulcanizing agents, vulcanization accelerators, softeners, oils, anti-aging agents, antioxidants, vulcanization retarders, and silane coupling agents. By allowing the carbon black and/or the white filler to be blended together with the organic microparticles described above, superior mechanical properties, such as tensile stress, tensile strength at break, and tensile elongation at break, of the tire rubber composition can be achieved.

Examples of the carbon black include furnace carbon blacks, such as SAF (Super Abrasion Furnace), ISAF (Intermediate Super Abrasion Furnace), HAF (High Abrasion Furnace), FEF (Fast Extrusion Furnace), GPE (General Purpose Furnace), and SRF (Semi-Reinforcing Furnace), and one of these can be used alone, or two or more types can be used in combination. The nitrogen adsorption specific surface area ($N_2SA$) of the carbon black is not particularly limited but is preferably from 10 to 300 $m^2/g$, more preferably from 20 to 200 $m^2/g$, and even more preferably from 50 to 150 $m^2/g$. In the present specification, the nitrogen adsorption specific surface area is measured in accordance with JIS K6217-2.

Examples of the white filler include silica, calcium carbonate, magnesium carbonate, talc, clay, alumina, aluminum hydroxide, titanium oxide, calcium sulfate, and the like. Among these, silica is preferable. These white fillers can be used alone or as a combination of two or more types of the white fillers.

Examples of the silica include wet silica (hydrous silicic acid), dry silica (silicic anhydride), calcium silicate, aluminum silicate, and the like. Among these, wet silica is preferable. These silicas can be used alone or as a combination of two or more types of the silicas. The CTAB (cetyltrimethylammonium bromide) adsorption specific surface area of the silica is not particularly limited but is preferably from 50 to 300 $m^2/g$, more preferably from 70 to 250 $m^2/g$, and even more preferably from 90 to 200 $m^2/g$. The CTAB adsorption specific surface area of the silica is measured in accordance with JIS K 6217-3.

In an embodiment of the present technology, the compounded amount of the carbon black and/or the white filler is, in terms of the total amount of the carbon black and the white filler, preferably from 1 to 120 parts by mass, more preferably from 5 to 110 parts by mass, and even more preferably from 10 to 100 parts by mass, per 100 parts by mass of the sulfur vulcanizable rubber.

When the silica is blended in the tire rubber composition, it is preferable to blend a silane coupling agent together with the silica because the dispersibility of the silica in the sulfur vulcanizable rubber can be enhanced. The compounded amount of the silane coupling agent is preferably from 3 to 15 mass %, and more preferably from 4 to 10 mass %, relative to the compounded amount of the silica. When the compounded amount of the silane coupling agent is less than 3 mass %, dispersibility of the silica cannot be sufficiently improved. When the compounded amount of the silane coupling agent is greater than 15 mass %, the silane coupling agents aggregate and condense, and the desired effects cannot be obtained.

The type of the silane coupling agent is not particularly limited, but a sulfur-containing silane coupling agent is preferable. Examples of the sulfur-containing silane coupling agent include bis-(3-triethoxysilylpropyl)tetrasulfide, bis(3-triethoxysilylpropyl)disulfide, 3-trimethoxysilylpropylbenzothiazol tetrasulfide, γ-mercaptopropyltriethoxysilane, 3-octanoylthiopropyltriethoxysilane, and the like.

In the tire rubber composition, a compounding agent that is typically used in tire rubber compositions for industrial use, such as vulcanizing agents, vulcanization accelerators, vulcanization aids, rubber reinforcing agents, softeners (plasticizers), anti-aging agents, processing aids, activators, mold release agents, heat-resistance stabilizers, weathering stabilizers, antistatic agents, coloring agents, lubricants, and thickeners, can be added. These compounding agents can be each used in a compounded amount that is typically used as long as the object of the present technology is not impaired, and can be added, kneaded, or mixed by an ordinary preparation method.

The tire rubber composition of an embodiment of the present technology can form a tread portion and a sidewall portion of a pneumatic tire. Among these, the tire rubber composition preferably forms a tire tread portion. A pneumatic tire in which the tire rubber composition of an embodiment of the present technology is used in these portions can enhance wear resistance, durability, wet grip performance, and low rolling resistance equal to or beyond levels in the related art.

The method of producing the tire rubber composition of an embodiment of the present technology include a step of preparing an emulsion of an organic microparticle, a step of preparing a microparticle composite, and a step of adjusting a rubber composition. In the step of preparing a microparticle composite, a microparticle composite is prepared by mixing the emulsion of the organic microparticles with a rubber latex, and then removing water from the mixture. In the step of adjusting a rubber composition, the obtained microparticle composite is blended in the sulfur vulcanizable rubber.

In the step of preparing an emulsion of an organic microparticle, adjustment is performed as follows. An emulsion of organic microparticles is prepared by polymerizing and/or crosslinking at least one selected from the group consisting of polymerizable monomers, oligomers, prepolymers, and polymers simultaneously or stepwise in water to form microparticles having an average particle size from 0.001 to 100 μm. Note that the oligomers, the prepolymers, and the polymers each are a polymer having a reactive functional group and having a molecular weight from 500 to 50000.

The obtained emulsion of the organic microparticles dispersed in water has high affinity with rubber latex and can be uniformly mixed and dispersed. Thereafter, by removing water, a microparticle composite in which the solid component of the rubber latex is uniformly and suitably adhered to the surface of the organic microparticle can be obtained.

The present technology is further explained below by Examples. However, the scope of the present technology is not limited to these Examples.

EXAMPLES

Production Example 1 (Production of Microparticle 1 and Microparticle Composite 1)

160 g of polycarbonate diol (T6001, available from Asahi Kasei Corporation; number average molecular weight: 1000) and 80 g of 4,4'-diphenylmethane diisocyanate (Millionate MT, available from Tosoh Corporation; number average molecular weight: 250) were reacted at 80° C. for 5 hours to obtain a polycarbonate urethane prepolymer having isocyanate at a terminal. Thereafter, to this, 800 g of polyether having a disulfide bond in its main chain (SULBRID 12, available from Daito Sangyo Co., Ltd.; number average molecular weight: 2500) and 800 g of methyl ethyl ketone (MEK, reagent) were mixed and reacted at 70° C. for 5 hours, and then cooled to room temperature. This reaction product of the polycarbonate and the disulfide bond-containing polyether was used as a reaction product 1.

Furthermore, separately from this, 24 g of dimethylol butanoic acid (DMBA, reagent) and 18 g of triethylamine (TEA, reagent) were mixed and dissolved in 40 g of methyl isobutyl ketone (MIBK, reagent), and then 64 g of m-xylylene diisocyanate (Takenate 500, available from Mitsui Chemicals, Inc.) and the reaction product 1 were added thereto and mixed for 5 minutes. Then, to this, 60 g of a sorbitan acid-based surfactant (TW-0320V, available from Kao Corporation) was added in 1600 g of water, and then charged into a high-speed dissolver type agitator and agitated at the rotational speed of 2000 rpm for 10 minutes. Thereafter, the temperature was gradually raised to 50° C., and the agitation was continued for 1 hour to obtain a milky-white emulsion solution. When this solution was measured by using a laser diffraction particle size distribution analyzer, it was confirmed that microparticles having the average particle size of 300 nm were produced. The emulsion of these organic microparticles was used as an emulsion of microparticles 1.

The emulsion of the microparticles 1 and a natural rubber latex (HA Latex, available from Golden Hope; solid component: 60 mass %) were mixed in a manner that the mass ratio of the organic microparticle solid content to the rubber solid content of the natural rubber latex was 2/5 to obtain a mixture. The obtained mixture was dried in a vacuum oven under the condition at 40° C. and $1.0\times10^4$ Pa to obtain a solid component of the mixture. The obtained solid component was used as a microparticle composite 1 formed from the solid components of the emulsion of the organic microparticles 1 and the natural rubber latex.

Production Example 2 (Production of Microparticle 2 and Microparticle Composite 2)

200 g of polycarbonate diol (T6001, available from Asahi Kasei Corporation; number average molecular weight: 1000) and 100 g of 4,4'-diphenylmethane diisocyanate (Millionate MT, available from Tosoh Corporation; number average molecular weight: 250) were reacted at 80° C. for 5 hours to obtain a polycarbonate urethane prepolymer having isocyanate at a terminal. Thereafter, to this, 1000 g of methyl ethyl ketone (MEK, reagent) and 1000 g of polyisoprene oligomer (Poly ip, available from Idemitsu Kosan Co., Ltd.) were added and mixed, and further reacted at 70° C. for 8 hours to obtain a reaction product 2.

Furthermore, separately from this, 20 g of trimethylolpropane (TMP, available from Mitsubishi Gas Chemical Co., Ltd.), methyl isobutyl ketone (MIBK, reagent), and 23 g of 2-isocyanatoethyl methacrylate (MOI, available from Showa Denko K.K.) were mixed and reacted at 80° C. for 4 hours to obtain a reaction product 3.

Thereafter, to the reaction product 2, 10 g of methyl isobutyl ketone (MIBK), 8.3 g of dimethylol butanoic acid (DMBA, reagent), and 6 g of triethylamine (TEA, reagent) were mixed and dissolved to obtain a mixture 1.

To the obtained mixture 1, 75 g of m-xylylene diisocyanate (Takenate 500, available from Mitsui Chemicals, Inc.) and all the amount of the reaction product 3 were mixed and agitated for 10 minutes. Then, 60 g of a sorbitan acid-based surfactant (TW-0320V, available from Kao Corporation), 80 g of pentaerythritol tetrakis(3-mercaptobutylate) (Karenz MT, available from Showa Denko K.K.), and 0.5 g of dibutyltin dilaurate (DBTL) in 1500 g of water were charged into a high-speed dissolver type agitator and agitated at the rotational speed of 1000 rpm for 30 minutes. Thereafter, the temperature was gradually raised to 70° C., and the agitation was further continued for 1 hour to obtain a milky-white emulsion solution. When this solution was measured by using a laser diffraction particle size distribution analyzer, it was confirmed that microparticles having the average particle size of 1 μm were produced. The emulsion of these organic microparticles was used as an emulsion of microparticles 2.

The emulsion of the microparticles 2 and a natural rubber latex (HA Latex, available from Golden Hope; solid component: 60 mass %) were mixed in a manner that the mass ratio of the organic microparticle solid content to the rubber solid content of the natural rubber latex was 2/5 to obtain a mixture. The obtained mixture was dried in a vacuum oven under the condition at 40° C. and $1.0\times10^4$ Pa to obtain a solid component of the mixture. The obtained solid component was used as a microparticle composite 2 formed from the solid components of the emulsion of the organic microparticles 2 and the natural rubber latex.

Production Example 3 (Production of Microparticle 3)

85 g of 2-acryloyloxyethyl isocyanate (Karenz AOL available from Showa Denko K.K.) and 46 g of bis(2-hydroxyethyl)disulfide having a disulfide bond (reagent) were reacted at room temperature for 1 day to obtain an acryl compound having a disulfide bond. To this, 258 g of methyl acrylate (available from Toagosei Co., Ltd.) and 384 g of butyl acrylate (available from Toagosei Co., Ltd.) were added. After the mixture was heated to 50° C., 0.33 g of 2,2'-azobisisobutyronitrile (reagent) and 0.4 g of laurylmercaptan (reagent) were added and agitated for 10 hours to perform polymerization. Then, the reaction product was cooled to room temperature. To this, a solution in which triethylamine was dissolved in distilled water so that the solid content was 30 mass % was added. The mixture was charged into a high-speed dissolver type agitator and agitated at the rotational speed of 2000 rpm for 10 minutes to obtain a milky-white emulsion solution. When this solution was measured by using a laser diffraction particle size distribution analyzer, it was confirmed that microparticles having the average particle size of 900 nm were produced. The emulsion of these organic microparticles was used as an emulsion of microparticles 3.

The emulsion of the microparticles 3 and a natural rubber latex (HA Latex, available from Golden Hope; solid component: 60 mass %) were mixed in a manner that the mass ratio of the organic microparticle solid content to the rubber solid content of the natural rubber latex was 2/5 to obtain a mixture. The obtained mixture was dried in a vacuum oven under the condition at 40° C. and $1.0\times10^4$ Pa to obtain a solid component of the mixture. The obtained solid component was used as a microparticle composite 3 formed from the solid components of the emulsion of the organic microparticles 3 and the natural rubber latex.

Production Example 4 (Production of Comparative Microparticle)

160 g of polycarbonate diol (T6001, available from Asahi Kasei Corporation; number average molecular weight: 1000) and 80 g of 4,4'-diphenylmethane diisocyanate (Millionate MT, available from Tosoh Corporation; number average molecular weight: 250) were reacted at 80° C. for 5 hours to obtain a polycarbonate urethane prepolymer having isocyanate at a terminal (reaction product 5).

Thereafter, to the obtained polycarbonate urethane prepolymer having isocyanate at a terminal (reaction product 5), 800 g of polyether having a disulfide bond in its main chain (SULBRID 12, available from Daito Sangyo Co., Ltd.; number average molecular weight: 2500) and 800 g of methyl ethyl ketone (MEK, reagent) were mixed and reacted at 70° C. for 5 hours, and then cooled to room temperature.

This reaction product of the polycarbonate and the disulfide bond-containing polyether was used as a reaction product 6.

Furthermore, separately from this, 24 g of dimethylol butanoic acid (DMBA, reagent) and 18 g of triethylamine (TEA, reagent) were mixed and dissolved in 40 g of methyl isobutyl ketone (MIBK, reagent), and then 64 g of m-xylylene diisocyanate (Takenate 500, available from Mitsui Chemicals, Inc.) and the reaction product 6 were added thereto and mixed for 5 minutes.

Then, to this, 60 g of a sorbitan acid-based surfactant (TW-0320V, available from Kao Corporation) was added in 1600 g of water, and then charged into an agitator equipped with a high-speed dissolver and agitated at the dissolver rotational speed of 2000 rpm for 10 minutes. Thereafter, the temperature was gradually raised to 50° C., and the agitation was continued for 1 hour to obtain a milky-white emulsion solution. When this solution was measured by using a laser diffraction particle size distribution analyzer, it was confirmed that microparticles having the average particle size of 300 nm were produced. The temperature was raised to 80° C. while this milky-white emulsion solution was agitated to vaporize the water, thereby obtaining a white powder. This was used as the comparative microparticles.

Preparation and Evaluation of Tire Rubber Composition

Compounding ingredients other than sulfur and vulcanization accelerators were weighed for each of 10 types of tire rubber compositions formed from the rubber compositions shown in Tables 1 and 2 (Examples 1 to 6 and Comparative Examples 1 to 4). These compounding ingredients were kneaded in a 1.7 L sealed Banbury Mixer for 5 minutes. Then, a master batch was discharged at a temperature of 150° C. and cooled at room temperature. Thereafter, this master batch was fed to a heating roll, and the sulfur and the vulcanization accelerator were then added to the master batch and mixed to prepare each of the 10 types of the tire rubber compositions. Note that, because SBR was an oil extended product, the net amount of the SBR except the oil-extending component was written in a parenthesis. A vulcanized rubber sheet was produced by subjecting each of the obtained 10 types of the tire rubber compositions to vulcanization at 160° C. for 20 minutes in a mold having a predetermined shape. The tensile characteristics (tensile stress at 100% deformation, tensile strength at break, and tensile elongation at break) and tan δ at 0° C. and 60° C. were evaluated by the following methods.

Tensile Test

Dumbbell-shaped JIS No. 3 test pieces, in accordance with JIS K 6251, were cut from the obtained vulcanized rubber sheets. By using the obtained test piece, the tensile stress at 100% deformation, the tensile strength at break, and the tensile elongation at break were measured in accordance with JIS K 6251. The obtained results are shown in Tables 1 and 2 as index values with the results of Comparative Example 1 being assigned the values of 100 in Table 1 or with the results of Comparative Example 3 being assigned the values of 100 in Table 2. For all index values, a greater index value indicates superior tensile stress at 100% deformation, tensile strength at break, or tensile elongation at break.

Tan δ at 0° C. and 60° C.

Using a viscoelastic spectrometer, available from Toyo Seiki Seisaku-sho, Ltd., the values of tan δ at temperatures of 0° C. and 60° C. were determined by measuring the dynamic visco-elasticity of the obtained vulcanized rubber sheet under conditions at an initial strain of 10%, an amplitude of ±2%, and a frequency of 20 Hz. The results are shown in Tables 1 and 2 as index values with the results of Comparative Example 1 being assigned the values of 100 in Table 1 or with the results of Comparative Example 3 being assigned the values of 100 in Table 2. A greater index value of tan δ (0° C.) means a greater tan δ (0° C.) and superior wet grip performance when the composition is made into a pneumatic tire. A smaller index value of tan δ (60° C.) means a smaller tan δ (60° C.), lower rolling resistance when the composition is made into a pneumatic tire, and superior fuel economy performance.

TABLE 1

| | | Comparative Example 1 | Example 1 | Example 2 | Example 3 | Comparative Example 2 |
|---|---|---|---|---|---|---|
| SBR | Parts by mass | 103 (75) | 103 (75) | 103 (75) | 103 (75) | 103 (75) |
| NR | Parts by mass | 25 | | | | 25 |
| Carbon black | Parts by mass | 50 | 40 | 40 | 40 | 40 |
| Microparticle composite 1 | Parts by mass | | 35 | | | |
| Microparticle composite 2 | Parts by mass | | | 35 | | |
| Microparticle composite 3 | Parts by mass | | | | 35 | |
| Comparative microparticle | Parts by mass | | | | | 10 |
| Zinc oxide | Parts by mass | 3.0 | 3.0 | 3.0 | 3.0 | 3.0 |
| Stearic acid | Parts by mass | 2.0 | 2.0 | 2.0 | 2.0 | 2.0 |
| Anti-aging agent | Parts by mass | 2.0 | 2.0 | 2.0 | 2.0 | 2.0 |
| Sulfur | Parts by mass | 1.5 | 1.5 | 1.5 | 1.5 | 1.5 |
| Vulcanization accelerator 1 | Parts by mass | 2.0 | 2.0 | 2.0 | 2.0 | 2.0 |
| Vulcanization accelerator 2 | Parts by mass | 0.5 | 0.5 | 0.5 | 0.5 | 0.5 |
| Oil | Parts by mass | 5.0 | 5.0 | 5.0 | 5.0 | 5.0 |
| Tensile stress at 100% deformation | Index value | 100 | 98 | 94 | 93 | 95 |
| Tensile strength at break | Index value | 100 | 112 | 106 | 103 | 90 |
| Tensile elongation at break | Index value | 100 | 125 | 114 | 121 | 96 |

TABLE 1-continued

| | | Comparative Example 1 | Example 1 | Example 2 | Example 3 | Comparative Example 2 |
|---|---|---|---|---|---|---|
| Rolling resistance index value (tan δ, 60° C.) | Index value | 100 | 98 | 95 | 95 | 101 |
| Wet grip performance index value (tan δ, 0° C.) | Index value | 100 | 104 | 103 | 103 | 100 |

TABLE 2

| | | Comparative Example 3 | Example 4 | Example 5 | Example 6 | Comparative Example 4 |
|---|---|---|---|---|---|---|
| SBR | Parts by mass | 103 (75) | 103 (75) | 103 (75) | 103 (75) | 103 (75) |
| NR | Parts by mass | 25 | | | | 25 |
| Silica | Parts by mass | 80 | 70 | 70 | 70 | 70 |
| Carbon black | Parts by mass | 10 | 10 | 10 | 10 | 10 |
| Microparticle composite 1 | Parts by mass | | 35 | | | |
| Microparticle composite 2 | Parts by mass | | | 35 | | |
| Microparticle composite 3 | Parts by mass | | | | 35 | |
| Comparative microparticle | Parts by mass | | | | | 10 |
| Silane coupling agent | Parts by mass | 5.0 | 4.5 | 4.5 | 4.5 | 4.5 |
| Zinc oxide | Parts by mass | 3.0 | 3.0 | 3.0 | 3.0 | 3.0 |
| Stearic acid | Parts by mass | 2.0 | 2.0 | 2.0 | 2.0 | 2.0 |
| Anti-aging agent | Parts by mass | 2.0 | 2.0 | 2.0 | 2.0 | 2.0 |
| Sulfur | Parts by mass | 1.5 | 1.5 | 1.5 | 1.5 | 1.5 |
| Vulcanization accelerator 1 | Parts by mass | 2.0 | 2.0 | 2.0 | 2.0 | 2.0 |
| Vulcanization accelerator 2 | Parts by mass | 0.5 | 0.5 | 0.5 | 0.5 | 0.5 |
| Oil | Parts by mass | 5.0 | 5.0 | 5.0 | 5.0 | 5.0 |
| Tensile stress at 100% deformation | Index value | 100 | 108 | 104 | 101 | 105 |
| Tensile strength at break | Index value | 100 | 121 | 115 | 104 | 98 |
| Tensile elongation at break | Index value | 100 | 127 | 119 | 124 | 97 |
| Rolling resistance index value (tan δ, 60° C.) | Index value | 100 | 93 | 92 | 94 | 102 |
| Wet grip performance index value (tan δ, 0° C.) | Index value | 100 | 108 | 117 | 110 | 105 |

The types of raw materials used in Table 1 are shown below.

SBR: styrene-butadiene rubber; trade name: Tufdene E581 (available from Asahi Kasei Chemicals Corporation); an oil extended product in which 37.5 parts by mass of extender oil was added per 100 parts by mass of SBR NR: natural rubber, HA Latex, available from Golden Hope; a product formed by drying a rubber latex having 60 mass % of solid component Silica: Zeosil 1165MP, available from Rhodia Carbon black: SEAST 6, available from Tokai Carbon Co., Ltd.

Microparticle composites 1 to 3: solid components of mixtures of emulsions of organic microparticles 1 to 3 obtained by Production Examples 1 to 3 described above and a natural rubber latex Comparative microparticle: microparticles obtained by Production Example 4 described above Silane coupling agent: bis(3-triethoxysilylpropyl)tetrasulfide; Si 69, available from Evonik Zinc oxide: Zinc Oxide III, available from Seido Chemical Industry Co., Ltd.

Stearic acid: Beads Stearic Acid YR, available from NOF Corporation

Anti-aging agent: Santoflex 6PPD, available from Flexsys

Sulfur: "Golden Flower" oil-treated sulfur powder, available from Tsurumi Chemical Industry, Co., Ltd.

Vulcanization accelerator 1: NOCCELER CZ-G, available from Ouchi Shinko Chemical Industrial Co., Ltd.

Vulcanization accelerator 2: Soxinol D-G, available from Sumitomo Chemical Co., Ltd.

Oil: Extract No. 4S, available from Showa Shell Sekiyu K.K.

From the results in Table 1, it was confirmed that the tire rubber compositions of Examples 1 to 3 achieved superior tensile strength at break, tensile elongation at break, tan δ at 60° C., and tan δ at 0° C., compared to those of tire rubber composition of Comparative Example 1.

It was confirmed that the tire rubber composition of Comparative Example 2 resulted in lower dispersibility in a rubber component, lower tensile strength at break and lower tensile elongation at break, and a larger tan δ at 60° C.

From the results in Table 2, it was confirmed that the tire rubber compositions of Examples 4 to 6 achieved superior tensile stress at 100% deformation, tensile strength at break, tensile elongation at break, tan δ at 60° C., and tan δ at 0° C., compared to those of tire rubber composition of Comparative Example 3.

It was confirmed that the tire rubber composition of Comparative Example 4 resulted in lower dispersibility in a rubber component, lower tensile strength at break and lower tensile elongation at break, and a larger tan δ at 60° C.

The invention claimed is:

1. A tire rubber composition comprising a microparticle composite in a sulfur vulcanizable rubber; the microparticle composite being a solid component of a mixture formed from an emulsion of an organic microparticle and a rubber latex; the emulsion of the organic microparticle being an emulsion containing a microparticle obtained by polymerizing and/or crosslinking at least one selected from the group consisting of polymerizable monomers, and oligomers, prepolymers, and polymers having a reactive functional group and having a molecular weight from 500 to 50000 simultaneously or stepwise in water; and an average particle size of the microparticle being from 0.001 to 100 μm.

2. The tire rubber composition according to claim 1, wherein the at least one selected from the group consisting of oligomers, prepolymers, and polymers has at least one selected from the group consisting of a mercapto group, a sulfur atom, and polysulfide bonds containing at least two sulfur atoms.

3. The tire rubber composition according to claim 1, wherein the at least one selected from the group consisting of oligomers, prepolymers, and polymers has at least one other reactive functional group except the group consisting of a mercapto group, a sulfur atom, and polysulfide bonds containing at least two sulfur atoms.

4. The tire rubber composition according to claim 1, wherein the oligomers, the prepolymers, and the polymers each have a backbone selected from the group consisting of polycarbonate-based, aliphatic-based, saturated hydrocarbon-based, and acrylic polymers, and copolymers of these.

5. The tire rubber composition according to claim 1, wherein at least one of the polymerizable monomer has at least one selected from the group consisting of a mercapto group, a sulfur atom, and polysulfide bonds containing at least two sulfur atoms.

6. The tire rubber composition according to claim 1, comprising from 1 to 100 parts by mass of the organic microparticle per 100 parts by mass total of the sulfur vulcanizable rubber and a solid content that is derived from the rubber latex.

7. The tire rubber composition according to claim 1, wherein a ratio W1/W2 of a mass W1 of the sulfur vulcanizable rubber to a mass W2 of the solid component derived from the rubber latex is in a range from 95/5 to 50/50.

8. The tire rubber composition according to claim 1, wherein the rubber latex is a natural rubber latex or a synthetic rubber latex.

9. The tire rubber composition according to claim 1, wherein the solid component derived from the rubber latex is 30 mass % or greater in the rubber latex, and a ratio W2/W3 of a mass W2 of the solid component derived from the rubber latex to a mass W3 of the organic microparticle is in a range from 1/4 to 4/1.

10. The tire rubber composition according to claim 1, further comprising a compounding agent, the compounding agent being at least one selected from the group consisting of carbon blacks, white fillers, vulcanizing agents, vulcanization accelerators, softeners, oils, anti-aging agents, antioxidants, vulcanization retarders, and silane coupling agents.

11. A pneumatic tire comprising a tire tread formed from the tire rubber composition described in claim 1.

12. A method of producing a tire rubber composition, the method comprising:

a step of preparing an emulsion of an organic microparticle by polymerizing and/or crosslinking at least one selected from the group consisting of polymerizable monomers, and oligomers, prepolymers, and polymers having a reactive functional group and having a molecular weight from 500 to 50000 simultaneously or stepwise in water to form a microparticle having an average particle size of 0.001 to 100 μm;

a step of preparing a microparticle composite by mixing the emulsion of the organic microparticle with a rubber latex to obtain a mixture, and then removing water of the mixture; and a step of blending the microparticle composite with a sulfur vulcanizable rubber.

13. The tire rubber composition according to claim 2, wherein the at least one selected from the group consisting of oligomers, prepolymers, and polymers has at least one other reactive functional group except the group consisting of a mercapto group, a sulfur atom, and polysulfide bonds containing at least two sulfur atoms.

14. The tire rubber composition according to claim 13, wherein the oligomers, the prepolymers, and the polymers each have a backbone selected from the group consisting of polycarbonate-based, aliphatic-based, saturated hydrocarbon-based, and acrylic polymers, and copolymers of these.

15. The tire rubber composition according to claim 14, wherein at least one of the polymerizable monomer has at least one selected from the group consisting of a mercapto group, a sulfur atom, and polysulfide bonds containing at least two sulfur atoms.

16. The tire rubber composition according to claim 15, comprising from 1 to 100 parts by mass of the organic microparticle per 100 parts by mass total of the sulfur vulcanizable rubber and a solid content that is derived from the rubber latex.

17. The tire rubber composition according to claim 16, wherein a ratio W1/W2 of a mass W1 of the sulfur vulcanizable rubber to a mass W2 of the solid component derived from the rubber latex is in a range from 95/5 to 50/50.

18. The tire rubber composition according to claim 17, wherein the rubber latex is a natural rubber latex or a synthetic rubber latex.

19. The tire rubber composition according to claim 18, wherein the solid component derived from the rubber latex is 30 mass % or greater in the rubber latex, and a ratio W2/W3 of a mass W2 of the solid component derived from the rubber latex to a mass W3 of the organic microparticle is in a range from 1/4 to 4/1.

20. The tire rubber composition according to claim 19, further comprising a compounding agent, the compounding agent being at least one selected from the group consisting of carbon blacks, white fillers, vulcanizing agents, vulcanization accelerators, softeners, oils, anti-aging agents, antioxidants, vulcanization retarders, and silane coupling agents.

* * * * *